United States Patent [19]

Jochmann et al.

[11] 4,321,579
[45] Mar. 23, 1982

[54] CIRCUIT ARRANGEMENT FOR MONITORING OPERATING FUNCTIONS IN MOTOR VEHICLES

[75] Inventors: Franz Jochmann, Munich; Helmut Fischer, Planegg; Wolfgang Dietz, Munich; Olaf Bauernfeind, Germering, all of Fed. Rep. of Germany

[73] Assignee: Bayerische Motoren Werke Aktiengesellschaft, Munich, Fed. Rep. of Germany

[21] Appl. No.: 3,955

[22] Filed: Jan. 16, 1979

[30] Foreign Application Priority Data

Jan. 18, 1978 [DE] Fed. Rep. of Germany ....... 2801954

[51] Int. Cl.³ ............................................. G08B 19/00
[52] U.S. Cl. .............................. 340/52 F; 307/10 R; 307/114; 340/514
[58] Field of Search ..................... 340/52 F, 514, 516; 307/10 R, 116

[56] References Cited

U.S. PATENT DOCUMENTS

| | | | |
|---|---|---|---|
| 2,817,074 | 12/1957 | Faulkner | 340/514 X |
| 2,947,980 | 8/1960 | Lemm et al. | 340/514 X |
| 3,944,969 | 3/1976 | Arai et al. | 340/52 F |
| 3,955,183 | 5/1976 | McBrian | 340/514 |
| 4,053,868 | 10/1977 | Cox et al. | 307/10 R X |
| 4,162,478 | 7/1979 | Huber et al. | 340/52 F |

*Primary Examiner*—John W. Caldwell, Sr.
*Assistant Examiner*—Joseph E. Nowicki
*Attorney, Agent, or Firm*—Craig and Antonelli

[57] ABSTRACT

A circuit arrangement for testing operating functions in motor vehicles by means of parallel circuits which contain at least one switching element conductive during a normal operating function and one control lamp and which are adapted to be closed by a test switch, and with one transmitter each coordinated to the operating functions which automatically triggers a warning indication with abnormal operating functions; at least one warning lamp for the warning indication which is independent of the control lamps is thereby provided in the circuit arrangement.

38 Claims, 7 Drawing Figures

CIRCUIT ARRANGEMENT FOR MONITORING OPERATING FUNCTIONS IN MOTOR VEHICLES

The present invention relates to a circuit arrangement for testing operating functions in motor vehicles of the type comprising parallel circuits which contain each at least one switching element that is conducting during normal operating functions and one control lamp and which are adapted to be closed in common by a testing switch, and one transmitter each coordinated to one of the operating functions which during abnormal operating functions automatically triggers a warning indication as described in the prior German patent application No. P 25 50 570.8 (corresponding to U.S. application Ser. No. 740,941, filed Nov. 11, 1976, now U.S. Pat. No. 4,162,478 and assigned to the assignee of the present application), the subject matter of which is incorporated herein by reference to the extent necessary. In the circuit arrangement according to the aforementioned German application, the control lamp itself serves as warning indication, which is turned on blinkingly or intermittently in case of a fault of the operating function.

The present invention is concerned with the task to so construct an alternative for the warning indication of the aforementioned German application that the occurrence of an abnormal operating function is rendered particularly clearly noticeable.

The underlying problems are solved according to the present invention in that a warning lamp independent of the control lamps is used for the warning indication. The effect of the warning indication can be additionally reinforced by a particular coloring, for example, green, for the control lamp and red for the warning lamps.

If a single warning lamp is provided for all operating functions, then the abnormal operating function can be recognized with a lighted-up warning lamp by actuation of the test switch since the control lamp for this operating function then does not light up.

In lieu of a single warning lamp for all operating functions, one warning lamp may be coordinated to each control lamp and therewith to each operating function. In this case, the actuation of the test switch for determining a faulty operating function is not required.

Additionally, it is possible to coordinate one warning lamp each to groups of transmitters for the operating functions and/or control lamps. Appropriately, the transmitters and/or control lamps of operating functions with the same importance may be combined thereby. The vehicle driver receives thereby the command, for example, with a turned-on or lighted-up control lamp for a group of operating functions with high significance such as brake fluid and engine oil level as well as engine oil and brake fluid pressure, that the immediate interruption or stoppage of the drive is required.

An advantageous further development of the circuit arrangement for testing the warning lamp consists according to the present invention in energizing or turning-on the warning lamps for a predetermined switching time during normal operating functions by a timing element in the form of a timing switch or circuit triggered upon actuation of the test switch.

It is thereby of advantage to turn off the control lamps during the switching time of the timing element, in lieu of a simultaneous engagement or turning on of control and warning lamps. During normal operating functions, at first the warning lamps light up during actuation of the test switch and subsequently the control lamps for the indication of the normal operating functions. The vehicle driver thus receives rapidly and safely the certainty that both the warning lamps as also the control lamps and the operating functions are in order.

Accordingly, it is an object of the present invention to provide a circuit arrangement for monitoring operating functions in motor vehicles, which avoid by simple means the aforementioned shortcomings and drawbacks encountered in the prior art.

Another object of the present invention resides in a circuit arrangement for testing operating functions in motor vehicles which render particularly noticeable the occurrence of an abnormal operating function.

A further object of the present invention resides in a circuit arrangement of the type described above which is simple in construction, reliable in operation and particularly effective to achieve the intended purposes.

A still further object of the present invention resides in a circuit arrangement for testing operating functions in motor vehicles which permits a testing of the control and warning circuits and parts thereof together with the monitoring of the operating functions.

Still another object of the present invention resides in a circuit arrangement for monitoring operating functions in motor vehicles which provides for the driver a rapidly obtainable, reliable assurance that the warning lamps as also the control lamps are intact and the operating functions are operating properly.

These and other objects, features and advantages of the present invention will become more apparent from the following description when taken in connection with the accompanying drawing which shows, for purposes of illustration only, several embodiments in accordance with the present invention, and wherein.

Figure 1:
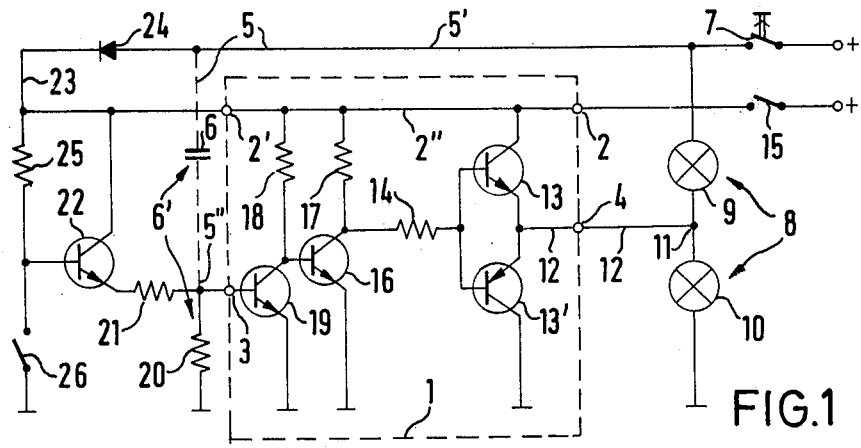
FIG. 1 is a circuit arrangement according to the present invention for monitoring operating functions in motor vehicles with control and warning lamps for indicating normal, respectively, abnormal operating functions.

Referring now to the drawing wherein like reference numerals are used throughout the various views to designate like parts, the circuit arrangement of FIG. 1 serves for the testing and the fault indication of an operating function such as cooling water, brake fluid, windshield cleaning fluid, and engine oil level, engine oil and brake fluid pressure and/or brake and taillight. It includes a bistable switching element 1, indicated in dash lines, having two inputs 2 and 3, a connection 2' and an output 4. The input 2 is directly connected with the connection 2' by way of a line 2". The input 2 is connected by way of an ignition switch 15 with the positive terminal (+) of the power supply. A line 5 leads from the positive terminal to the input 3, whereby a condenser 6 is connected into the line branch 5" thereof and a test switch 7 is connected into the other line branch 5' thereof. A voltage divider generally designated by reference numeral 8 is connected to the line branch 5', which consists of a control lamp 9 and of a warning lamp 10 and whose center tap 11 is connected by way of a line 12 with the output 4 of the bistable switching element 1.

The bistable switching element 1 includes two complementary transistors 13 and 13', whose collector-emitter circuits are connected in series. The collector of the n-p-n transistor 13 is connected to the line 2" while the collector of the p-n-p transistor 13' is connected to the ground of the power supply. The bases of the transistors 13 and 13' are connected by way of a resistance 14 with the collector of a control transistor 16 whose collector and base are connected by way of resistances 17 and 18 with the line 2". A further control transistor 19 is coordinated to the control transistor 16, whose collector is connected with the base of the control transistor 16 and whose base is connected with the input 3 of the bistable switching element 1.

The input 3 of the bistable switching element 1 is connected by way of a resistance 20 with the ground of the power supply and by way of a resistance 21 with the emitter of a transistor 22.

The resistance 20 together with the condenser 6 forms a timing element in the form of a timing circuit or switch 6'. The collector of the transistor 22, on the one hand, is connected to the connection 2' of the bistable switching element 1 and, on the other, is connected by way of a line 23, which includes a diode 24, with the line 5. The base of the transistor 22 is also connected, on the one hand, by way of a resistance 25 and the line 23 with the line 5 and, on the other, by way of a switch 26 with the ground of the power supply. The switch 26 is coordinated to the operating function to be monitored and is closed during normal operating function, whereas it is opened during abnormal operating function.

With a normal operating function and thus with a closed switch 26, with a closed ignition switch 15 and with an open test switch 7, the transistor 22 is blocked, i.e., is non-conductive. The input 3 of the bistable switching element 1 receives ground potential by way of the resistance 20 so that the control transistor 19 is also blocked, i.e., is also non-conductive and thus the control transistor 16 is conductive. As a result thereof, the transistor 13 also blocks, i.e., is also non-conductive whereas the transistor 13' is conductive. Ground potential exists at the output 4 as also at the input 3. Since the diode 24 prevents a current flow to the voltage divider 8 by way of the ignition switch 15, the control lamp 9 and the warning lamp 10 remain dark.

With an abnormal operating function and thus with an open switch 26 and with a closed ignition switch 15 and/or test switch 7, the transistor 22 is conductive. The input 3 receives positive (+) potential by way of the collector-emitter circuit of this transistor 22 and the resistance 21. As a result thereof, the control transistor 19 becomes conducting and the control transistor 16 blocks, i.e., becomes non-conducting. The transistor 13 is conducting whereas the transistor 13' is non-conducting. Plus potential reaches the output 4 by way of the collector-emitter circuit of the transistor 13 as well as the input 3 so that the warning lamp 10 lights up whereas the control lamp 9 is deenergized or turned off.

With a normal operating function—with a closed switch 26—positive potential reaches the input 3 by way of the condenser 6 after the closing of the test switch 7 as with an abnormal operating function. Hence, positive potential also exists at the output 4. The warning light 10 lights up and enables its own testing whereas the control lamp is turned off or deenergized. Simultaneously therewith, the condenser 6 is charged, which after a predetermined switching time of the timing element 6' of, for example, 5 seconds, separates the positive potential from the input 3, as a result of which ground potential reaches the input 3 anew by way of the resistance 20. Ground potential then also exists at the output 4 so that the control lamp 9 lights up and indicates the normal operating function whereas the warning lamp 10 becomes extinguished.

A faulty control lamp 9 or warning lamp 10 can be recognized during a normal operating function in that in this case during the switching time of the timing element 6', the faulty warning lamp 10 does not light up and subsequently thereto the faulty control lamp 9 does not light up. Simultaneously, it can be ascertained with certainty by the lighting up of the warning lamp 10 alone during the switching time, respectively, by the lighting up of the control lamp 9 after this switching time that the operating function itself is in order. With an abnormal operating function, in contrast thereto, only the warning lamp 10 can light up with a closed test switch 7, respectively, with a closed ignition switch 15. If the warning lamp 10 thus remains dark after actuation of the test switch 7 and if the control lamp 9 also does not light up after the lapse of the switching time of the timing circuit 6, then it follows therefrom that either with a proper condition of the control lamp both the operating function as also the warning lamp are not in order, or that with a normal operating function, both the control lamp and also the warning lamp are not in order.

Figure 2:
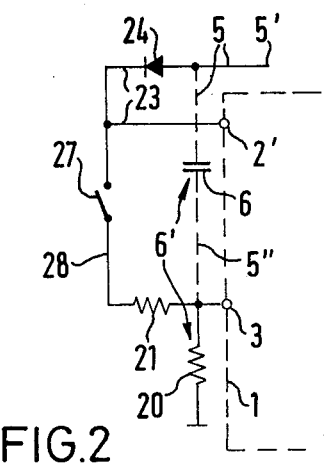
FIG. 2 is a modified embodiment of a part of the circuit arrangement of FIG. 1 as regards the construction of the transmitter for the operating function.

In the circuit arrangement of FIG. 2, the switch 27 is coordinated to the operating function, which during normal operating function is opened and during abnormal operating function is closed. The switch 27 is connected in a line 28 which leads from the input 3 of the bistable switching element 1 to the line 28. As with the circuit arrangement of FIG. 1, positive potential exists at the input 3 with an abnormal operating function and with a normal operating function for the switching time of the timing circuit 6', while ground potential exists at the input 3 with a normal operating function after the expiration of this switching time by way of the resistance 20. The operation of the circuit arrangements of FIG. 1 and FIG. 2 is the same.

Figure 3:
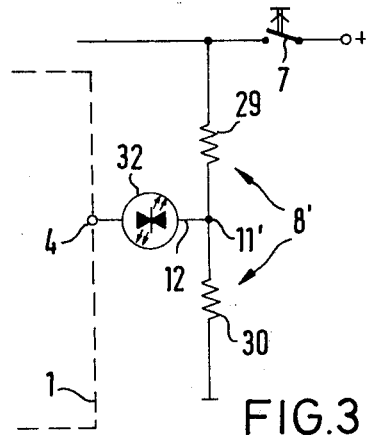
FIG. 3 is a further modified embodiment of a part of the circuit arrangement of FIG. 1, in which the functions of the control and warning lamps are taken over by bi-directional light diodes.

In the circuit arrangement of FIG. 3, a voltage divider 8' consisting of two resistances 29 and 30 is provided in lieu of the voltage divider 8. A two-directional light diode 32 which has a color dependent on the direction of current flow is connected in the line 12 to the center tap 11' of this voltage divider 8'. If with a closed ignition switch 15 and/or with a closed test switch 7, positive potential exists at the output 4 of the bistable switching element 1 by reason of an abnormal operating function, respectively, during the switching time of the timing circuit 6', then the current flows from the output 4 to the center tap 11'. The light diode 32 produces a light characteristic for a warning indication, for example, of red, yellow or orange color.

With a normal operating function, possibly after the lapse of the switching time of the timing circuit 6', in contrast thereto, the output 4 is at ground potential so that with a closed test switch 7, the current flows from the center tap 11' to the connection 4. The two-directional light diode 32 produces a light characteristic for a normal operating function, for example, of green color.

Figure 4:
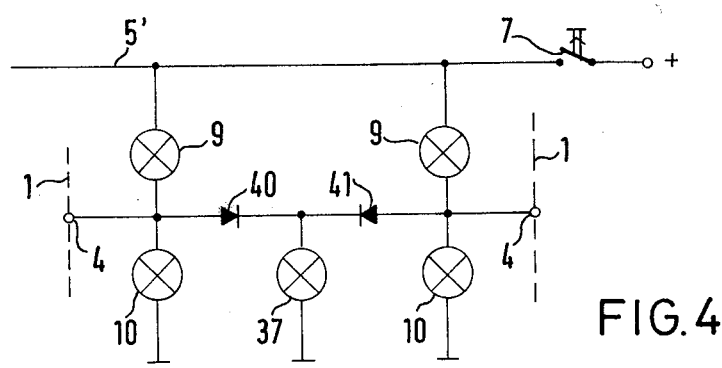
FIG. 4 is another modified embodiment of a part of the circuit arrangement of FIG. 1, in which a central warning lamp is provided for several operating functions.

In the circuit arrangement of FIG. 4, one control lamp 9 each, possibly one warning lamp 10 each, and one common warning lamp 37 is coordinated to several bistable switching elements 1 for monitoring different operating functions. The warning lamp 37 is arranged in a noticeable place within the field of vision of the driver.

Diodes 40 and 41 are arranged between the control lamps 9 and the warning lamp 37.

If the operating functions coordinated to the switching elements 1 are normal, then ground potential exists at the outputs 4 with a closed testing switch 7 and possibly after the lapse of the switching time of a timing element 6' for the switching elements 1. The control lamps 9 light up.

If an operating function to be monitored is abnormal, then with a closed ignition switch 15, respectively, with a closed test switch 7, positive potential exists at the output 4 of the one switching element so that the warning lamp 37 and the possibly existing warning lamp 10 light up. For purposes of differentiation, as to which of the operating functions is abnormal, the test switch 7 is closed with missing warning lamps. All of the control lamps 9 for the normal operating functions with the exception of the control lamp 9 for the abnormal operating function and the warning lamp 37 thereby light up.

Figure 5:
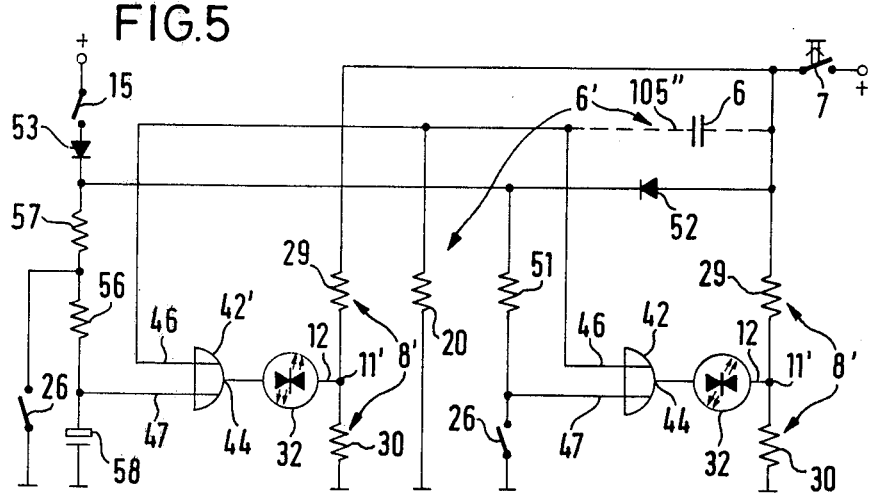
FIG. 5 is still another modified embodiment of the circuit arrangement of FIG. 1 in accordance with the present invention utilizing other electronic elements as switching elements.

In the circuit arrangement according to FIG. 5, two OR elements 42 and 42' are arranged in parallel to one another as bistable switching elements. Their outputs 44 correspond to the output 4 of the bistable switching element 1. Their inputs 46 are connected, like the input 3 of the bistable switching element of the FIGS. 1 to 4, with a timing element generally designated by reference numeral 6' which consists of a resistance connected to ground and of the condenser 6 arranged in a line 105''. The other input 47 of the OR element 42 is connected, on the one hand, directly with the ground by way of the switch 26, and, on the other hand, with the test switch 7 and the ignition switch 15, by way of a resistance 51 as well as diodes 52 and 53. The other input 47 of the OR element 42' is connected, on the one hand, with the ground by way of resistance 56 and switch 26, and, on the other hand, with the test switch 7 and the ignition switch 15 by way of resistance 56 and another resistance 57 as well as diodes 52 and 53. A delay condenser 58 is connected between the input 47 of the OR element 42' and the ground.

If a positive potential exists at one of the inputs 46 and 47 or at both inputs, then also the output 44 is at positive potential. This is the case with an abnormal operating function (switch 26 open) and with a closed ignition switch 15 and/or with a closed test switch 7, respectively, with a normal operating function after the closing of the test switch 7 during the switching time of the timing circuit 6'. The two-directional light diode 32 indicates an abnormal operating function, respectively, its proper function as warning indication.

If, in contrast thereto, ground potential exists at both inputs 46 and 47, then ground potential also exists at the output 44. With a closed test switch 7, two two-directional light diodes 32 thereby indicate the normal operating function.

The condenser 58 effects that with an only brief abnormal operating function, such as, for example, with a momentary drop of a liquid level that occurs only for a short period of time by reason of an acceleration and thus with an opening of the switch 26 for only a short period of time, ground potential continues to exist initially at the input 47 of the one OR element 42'. Consequently, such a brief switching of the operating function into the abnormal condition does not have as a consequence a warning indication of the coordinated light diode 32. However, if the operating function is abnormal and the condenser 58 is charged, then positive potential exists at the input 47 of the one OR element 42' and the warning indication appears.

Figure 6:
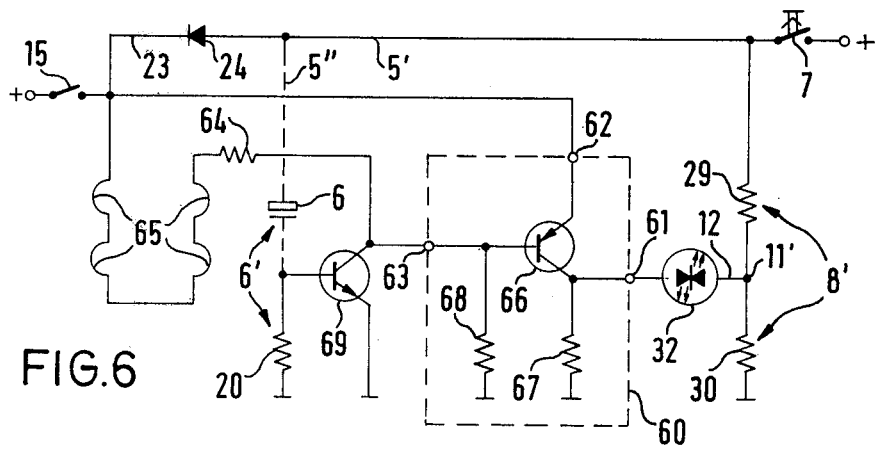
FIG. 6 is a still further modified embodiment of the circuit arrangement of FIG. 1 for monitoring brake wear.

In the circuit arrangement of FIG. 6, a bistable switching element 60 is provided for monitoring the thickness of brake linings, to the output 61 of which is connected the line 12 that includes the two-directional light diode 32. The bistable switching element 60 includes two inputs 62 and 63, of which the input 62 is adapted to be connected by way of the ignition switch 15 and by way of the test switch 7 to the positive terminal of the power supply. The input 63 is also connected with the ignition switch 15 and the test switch 7 by way of a resistance 64 and several series-connected conductor loops 65. The conductor loops 65 are arranged in the brake linings to be monitored and, upon reaching a predetermined minimum thickness of the respective brake linings, are opened up or interrupted.

The bistable switching element 60 includes a switching transistor 66 which is connected with its emitter to the input 62 and with its collector, on the one hand, to the output 61 and, on the other, by way of a resistance 67 to the ground of the power supply. The base of the switching transistor 66 is connected by way of a resistance 68 with ground and by way of the input 63 with the collector of a control transistor 69 whose base is connected with the timing circuit generally designated by reference numeral 6'.

The switching transistor 66 is blocked, i.e., is non-conductive if positive potential exists at its base, and is conducting if ground potential exists thereat. In the former case, the output 61 is at ground potential by way of the resistance 67 while in the latter case with a closed ignition switch 15 and/or with a closed test switch 7, the output is at positive potential by way of the switching transistor 66.

If at least one of the brake linings is worn to its minimum thickness and therewith the associated conductor loop 65 is interrupted, then the switching transistor 66 becomes conductive since its base receives ground potential by way of the resistance 68 and during actuation of the brake also by way of the conductor loop and the coordinated brake disk. With a closed ignition switch 15 and/or test switch 7, current flows from the output 61 through the two-directional light diode 32 and the resistance 30. The two-directional light diode 32 indicates the abnormal condition of the brake linings.

If the thickness of each of the brake linings is greater than the minimum thickness and if thus the conductor loops 65 are closed, then the switching transistor 66 is initially blocked or non-conductive. With a closing of the test switch 7, the condenser 6 is charged, and the control transistor 69 becomes conductive for a short period of time during the switching time of the timing element 6', as a result of which ground potential is applied during this switching time to the input 63 by way of the control transistor 69 and subsequent thereto, positive potential is again applied to the input 63. As a result thereof, at first the warning indication of the bidirectional light diode 32 is tested and subsequently thereto, the control indication thereof together with the condition of the brake linings.

Figure 7:
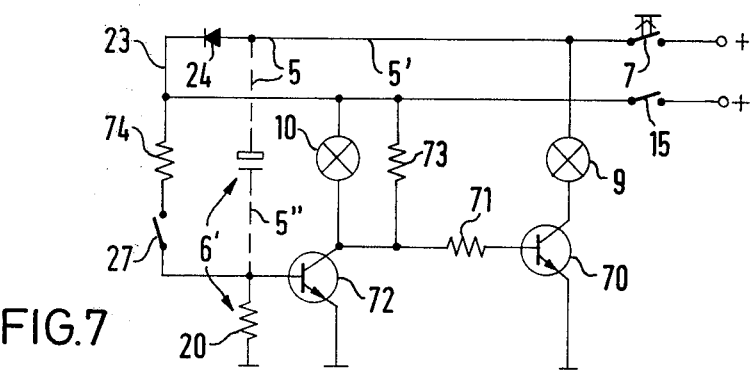
FIG. 7 is still another modified embodiment of the circuit arrangement according to FIG. 1 in accordance with the present invention.

In the circuit arrangement of FIG. 7, the control lamp 9 is connected into the collector circuit of a first transistor 70 whose base is connected by way of a resistance 71 with the collector of a second transistor 72. The warning lamp 10 and in parallel thereto, a resistance 73 are arranged in the collector circuit of the transistor 72. The collector circuits of the transistors 70 and 72 are adapted to be switched by the test switch 7 and the collector circuit of the transistor 72 is additionally adapted to be switched by the ignition switch 15. The base of the transistor 72 is connected to the timing element 6' and by way of the switch 27 and a resistance 74, on the one hand, with the ignition switch 15 and, on the other, with the test switch 7.

The first transistor 70 is conductive if the second transistor 72 is non-conductive. With a closed test switch 7, the control lamps 9 then light up. Conversely, the transistor 70 is non-conductive when the transistor 72 is conductive. In this case, the warning light 10 lights up with a closed test switch 7 and/or ignition switch 15.

With an abnormal operating function and thus with a closed switch 27, positive potential is applied to the base of the transistor 72 which thus becomes conductive. The warning lamp 10 lights up. With a normal operating function, positive potential also reaches the base of the transistor during the switching time of the timing element 6' after the closing of the testing switch 7 by way of the condenser 6, as a result of which the transistor 72 becomes conductive. After the lapse of the switching time, the transistor 72 becomes again non-conductive and causes the transistor 70 to become conductive, whence the control lamp 9 lights up in lieu of the warning lamp 10.

If the warning lamp 10 is faulty, then the resistance 73 takes care for bridging the warning lamp 10 and enables the lighting up of the control lamp 9 during a normal operating function and with closed test switch 7.

All of the embodiments of the present invention enable an automatic warning indication of abnormal operating functions which can be clearly distinguished from the control indication of the normal operating functions inclusive the testing of the control lamps themselves as taken over by the circuit arrangement of the aforementioned German patent application. The regular testing of the warning lamps also takes place in a clear representation each time at the beginning of the control operation by the short lighting up thereof prior or together with the control lamps.

If one dispenses with the testing of the warning lamps, then only the line branch 5", respectively, 105" together with the condenser 6 are obviated in the described embodiments.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A circuit arrangement for monitoring operating functions in motor vehicles, comprising parallel circuit means each including at least one switching means conducting during normal operating functions, indicating means, comprised of at least a control lamp means and a warning lamp means, for controlling each one of said control lamp means and said warning lamp means to produce an indication only in the absence of an indication produced by the other, test switch means for closing said parallel circuit means, and transmitter means coordinated to the operating functions for automatically triggering said warning lamp means to produce a warning indication with abnormal operating functions.

2. A circuit arrangement according to claim 1, characterized in that the test switch means is operable to close in common the parallel circuit means.

3. A circuit arrangement according to claim 1, characterized in that one warning lamp means each is coordinated to each control lamp means.

4. A circuit arrangement according to claim 1, characterized in that one warning lamp means each is coordinated to a group of transmitter means.

5. A circuit arrangement according to claim 1, characterized in that one warning lamp means each is coordinated to a group of control lamp means.

6. A circuit arrangement according to claim 1, characterized in that one warning lamp means each is coordinated to groups of transmitter and control lamp means.

7. A circuit arrangement according to claim 1, characterized in that one warning lamp means each is coordinated to groups of at least one of transmitter and control lamp means.

8. A circuit arrangement according to claim 1, 3 or 7, characterized in that the warning lamp means with normal operating functions are adapted to be energized for a predetermined switching time by a timing means triggered upon actuation of the test switch means.

9. A circuit arrangement according to claim 8, characterized in that the control lamp means includes means to turn off said control lamp means during the switching time of the timing means.

10. A circuit arrangement according to claim 9, characterized in that the timing means includes a time-determining condenser means switched by way of the test switch means.

11. A circuit arrangement according to claim 9, wherein said transmitter means comprises a bistable switching means to transmit signals to at least one of said control lamp means and said warning lamp means whose one switching condition is coordinated to one of a normal operating function and a corresponding abnormal operating function and whose other switching condition is coordinated to the other one of the normal operating function and the corresponding abnormal operating function.

12. A circuit arrangement according to claim 11, characterized in that the bistable switching means includes two complementary transistors which are series-connected with their emitter-collector circuits between positive and negative terminals of a power supply means and whose base bias voltage is controlled, on the one hand, by the test switch means and, on the other, by the at least one switching means for an operating function.

13. A circuit arrangement according to claim 11, characterized in that the bistable switching means includes a logic switching element having two inputs, of which one is operable to be switched by way of the test switch means and of which the other is operable to be switched by way of the at least one switching means for an operating function.

14. A circuit arrangement according to claim 13, characterized in that the logic switching element is an OR element.

15. A circuit arrangement according to claim 11, characterized in that the bistable switching means includes a switching transistor which is controlled by the at least one switching means for an operating function and by the test switch means.

16. A circuit arrangement according to claim 15, characterized in that the at least one switching means includes a conductor loop in the part to be monitored which, upon predetermined wear, is interrupted.

17. A circuit arrangement according to claim 11, characterized in that the bistable switching means includes an output, to which is applied positive potential in one switching condition and negative potential of a power supply means in the other switching condition.

18. A circuit arrangement according to claim 17, characterized in that the output of the bistable switching means is operatively connected with a tap of a voltage divider means which is operable to be connected by way of the test switch means with the voltage of the power supply means.

19. A circuit arrangement according to claim 18, characterized in that said control lamp means and said warning lamp means together include a two-way light diode means having a color dependent on the direction of current flow connected in a line connecting the output of the bistable switching means and the tap of the voltage divider means.

20. A circuit arrangement according to claim 18, characterized in that the warning lamp means and the control lamp means form the voltage divider means.

21. A circuit arrangement according to claim 8, characterized in that the control lamp means is connected in a collector circuit of a first transistor, said collector circuit being operable to be switched by the test switch means to the positive potential of a power supply means, the base of the first transistor being operatively connected with the collector of a second transistor which is controlled by the transmitter means for an operating function, the warning lamp means being connected in the collector circuit of the second transistor.

22. A circuit arrangement according to claim 21, characterized in that a resistance is connected in parallel with the warning lamp means.

23. A circuit arrangement according to claim 8, characterized in that a delay capacitor means is coordinated to a transmitter means for an operating function.

24. A circuit arrangement according to claim 8, characterized in that the transmitter means is a switch means.

25. A circuit arrangement according to claim 8, characterized in that the timing means includes a time-determining condenser means switched by way of the test switch means.

26. A circuit arrangement according to claim 1, wherein said transmitter means comprises a bistable switching means to transmit signals to at least one of said control lamp means and said warning lamp means whose one switching condition is coordinated to one of a normal operating function and a corresponding abnormal operating function and whose other switching condition is coordinated to the other one of the normal operating function and the corresponding abnormal operating function.

27. A circuit arrangement according to claim 26, characterized in that the bistable switching means includes two complementary transistors which are series-connected with their emitter-collector circuits between positive and negative terminals of a power supply means and whose base bias voltage is controlled, on the one hand, by the test switch means and, on the other, by the at least one switching means for an operating function.

28. A circuit arrangement according to claim 26, characterized in that the bistable switching means includes a logic switching element having two inputs, of which one is operable to be switched by way of the test switch means and of which the other is operable to be switched by way of the at least one switching means for an operating function.

29. A circuit arrangement according to claim 28, characterized in that the logic switching element is an OR element.

30. A circuit arrangement according to claim 26, characterized in that the bistable switching means includes a switching transistor which is controlled by the at least one switching means for an operating function and by the test switch means.

31. A circuit arrangement according to claim 30, characterized in that the at least one switching means includes a conductor loop in the part to be monitored which, upon predetermined wear, is interrupted.

32. A circuit arrangement according to claim 26, characterized in that the bistable switching means includes an output, to which is applied positive potential in one switching condition and negative potential of a power supply means in the other switching condition.

33. A circuit arrangement according to claim 32, characterized in that the output of the bistable switching means is operatively connected with a tap of a voltage divider means which is operable to be connected by way of the test switch means with the voltage of the power supply means.

34. A circuit arrangement according to claim 32 or 33, characterized in that said control lamp means and said warning lamp means together include a two-way light diode means having a color dependent on the direction of current flow connected in a line connecting the output of the bistable switching means and the tap of the voltage divider means.

35. A circuit arrangement according to claim 33, characterized in that the warning lamp means and the control lamp means form the voltage divider means.

36. A circuit arrangement according to claim 26, 27, 28, 30 or 32, characterized in that a delay capacitor means is coordinated to at least one switching means for an operating function.

37. A circuit arrangement for monitoring operating functions in motor vehicles, comprising parallel circuit means each including at least one switching means conducting during normal operating functions, and one control lamp means and one warning lamp means, test switch means for operating said parallel circuit means, transmitter means coordinated to the operating functions for automatically transmitting a signal upon existence of abnormal operating functions, timer means to generate a signal after a period of time t measured from the closure of said test switch, and means responsive to said transmitter and timer means to control said control lamp means and warning lamp means according to the following truth table:

| Operation | Timer Means | Transmitter Means | Test Switch Means | Control Lamp Means | Warning Lamp Means |
|---|---|---|---|---|---|
| Normal | t < T | Closed | Closed | Off | On |
| Normal | t > T | Closed | Closed | On | Off |
| Abnormal | t > 0 | Open | Closed | Off | On | wherein T represents a predetermined time period measured from the closure of said test switch.

38. A circuit arrangement according to claim 37, wherein a faulty one of said warning lamp means and said control lamp means causes the circuit arrangement to violate the truth table.

* * * * *